(12) United States Patent
Brand

(10) Patent No.: US 6,646,572 B1
(45) Date of Patent: Nov. 11, 2003

(54) METHOD FOR DESIGNING OPTIMAL SINGLE POINTER PREDICTIVE KEYBOARDS AND APPARATUS THEREFORE

(75) Inventor: Matthew Brand, Cambridge, MA (US)

(73) Assignee: Mitsubish Electric Research Laboratories, Inc., Cambridge, MA (US)

(*) Notice: Subject to any disclaimer, the term of this patent is extended or adjusted under 35 U.S.C. 154(b) by 0 days.

(21) Appl. No.: 09/506,610

(22) Filed: Feb. 18, 2000

(51) Int. Cl.[7] .................. H03K 17/94; H03M 11/00
(52) U.S. Cl. .................. 341/22; 341/23; 341/34; 345/128; 345/173; 382/230
(58) Field of Search ................. 341/22, 23, 34; 345/128, 130, 169, 173, 179; 382/230

(56) References Cited

U.S. PATENT DOCUMENTS

| | | | |
|---|---|---|---|
| 4,211,497 A | 7/1980 | Montgomery | 400/486 |
| 4,579,470 A | 4/1986 | Casey | 400/489 |
| 5,128,672 A | 7/1992 | Kaehler | 341/23 |
| 5,487,616 A | 1/1996 | Ichbiah | 400/489 |
| 5,625,354 A | 4/1997 | Lerman | 341/20 |
| 5,784,060 A | 7/1998 | Bertram et al. | 345/354 |
| 5,805,157 A | 9/1998 | Bertram et al. | 345/339 |
| 5,963,671 A * | 10/1999 | Comerford et al. | 345/168 |
| 6,005,495 A * | 12/1999 | Connolly et al. | 341/22 |
| 6,011,554 A | 1/2000 | King et al. | 345/352 |

FOREIGN PATENT DOCUMENTS

WO    WO 0057265 A    9/2000

OTHER PUBLICATIONS

Ron et al. "The Power of Amnesia: Learning Probalistic Automata with Variable Memory Length"; Machine Learning, 1997.
Guyon et al. "Design of a Linguistic Postprocessor Using Variable Memory length Markov Models".

* cited by examiner

Primary Examiner—Timothy Edwards
(74) Attorney, Agent, or Firm—Dirk Brinkman; Andrew Curtin

(57) ABSTRACT

Keys are arranged on a keyboard as learned during a training stage. During training, a training corpus of input symbol sequence is provided. Each unique symbol in the corpus has an associated key on the keyboard. A cost function that measures a cost of inputting the symbols of the training corpus is globally minimized. Then, the keys are arranged on the keyboard according to the globally minimized cost function. To reduced the distance a pointer must move, the keys can also be arranged in a hexagonal pattern.

23 Claims, 3 Drawing Sheets

METHOD FOR DESIGNING OPTIMAL SINGLE POINTER PREDICTIVE KEYBOARDS AND APPARATUS THEREFORE

FIELD OF THE INVENTION

The present invention relates generally to keyboards, and more particularly to designing an optimal single pointer keyboard.

BACKGROUND OF THE INVENTION

In traditional keyboards, the keys representing the various characters or symbols in a written language are typically arranged in rows in such a way that typing with two hands is rapid and efficient. However, traditional keyboards require extensive training and practice before full proficiency is attained. An untrained user types by tedious hunting and pecking. With a keyboard arranged in the most common "QWERTY" arrangement, the untrained user is faced with an apparently random distribution of keys, and the speed at which the keyboard can be operated suffers tremendously. In fact, the "QWERTY" arrangement is not random; it was actually designed to limit two-handed typing speed.

The speed at which an untrained user can operate a keyboard can be usefully studied with a simple user interaction model that breaks down user actions into three stages: scanning, deciding, and physically selecting. The time to complete an action is the sum of the delays incurred at each stage, for example:

Total time or cost to type a key=$T_v+T_c+T_m$ where $T_v$ is the visual load, $T_c$ the cognitive load, and $T_m$ the motor load.

Visual Load

An important part of the visual load is the eye movements that must be made while hunting for a key. The organization of photoreceptors in the eye is such that the vast majority of the receptors are located in a small region in the center of the retina called the fovea, a window that receives light stimuli subtending approximately 1° of the visual field. Similarly, most of the brain's visual intelligence is concentrated on this small area. Visual tasks such as shape recognition and reading require that the eye be oriented so that the image of the object in question is projected onto or very near the fovea.

Therefore, while hunting for a key, it is necessary to repeatedly re-orient the eye so that the images of each of many randomly distributed keys project onto this high-resolution area. Only then can detailed perceptual analysis begin. The method by which eyes are oriented is known as a saccade—an oculomotor reaction that moves the eyeball such that the image of interest is foveated. To compound the problem, if the eye movement is large, the saccade may miss the target and further delays are incurred as the eye position is adjusted.

An efficient keyboard should minimize saccades. Ideally, the most frequently used portion of the keyboard should be visually compact, so that this portion is mostly contained in the fovea. Equally important, when necessary, saccades should be small. The less the eyes move and the more visually stable the keyboard, the faster hunting and pecking can proceed. Obviously, most "standard" keyboards, with a length of almost a foot and a half, and an aspect ratio as high as five to one, are ill suited for casual hunt-and-peck users.

Cognitive Load

In the context of typing, cognitive load refers to work done while deciding between keys, and planning where to look or point next. Deciding and planning are memory-limited processes. It takes longer to decide between many alternatives. Not just because there are more, but also because short-term memory is quite limited. When there are too many alternatives, some must be moved in and out of short-term memory, for example, by looking at the keyboard again. Typically, people can choose amongst two or three alternatives quickly but slow down considerably when faced with five or more choices.

If the keyboard is laid out in a meaningful manner, such as an alphabetic order, then the cognitive load is somewhat reduced because the mind does not need to plan out a search strategy for finding the next appropriate key. If the user does not have perfect knowledge of the location of each letter, then some searching is unavoidable. In that case, cognitive load can be reduced by embedding familiar patterns in the arrangement of the keys, for example, by placing the letters of mnemonic sequences such as "qu", "th", "ing" on adjacent keys. Having seen "q" the user has strong expectations about where to find the following "u". Providing familiar patterns to the user also reduces cognitive load because a familiar pattern or relationship imposes less working memory load than its individual constituents.

Motor Load

A good keyboard should not require a lot of pointer travel, or highly precise motions. It is easy to make small, incremental motions, e.g., to move to an adjacent key, but hard to land precisely on a key that is far away. One way of reducing motor load is by making targets as large and round as possible. This suggests laying the keys out as hexagonal tiles in a triangular grid.

U.S. Pat. No. 4,579,470 teaches a keyboard with keys clustered in a hexagonal-like pattern. The clustering attempts to minimize finger movement for a two-handed user. That keyboard has no special properties for hunt-and-peck typing.

U.S. Pat. No. 5,128,672 describes a predictive "soft keyboard." The set of twelve keys that are displayed depend on the frequency of a particular character combination being used in a particular language. For example, one character set is displayed after a vowel, and another after a constant. The object is to provide a keyboard with a minimal number of keys, i.e., twelve. A tough-sensitive hand-held implementation is suggested. Statistical analysis of linguistic characteristics is vaguely described for making the predication about which character set to display at a given instant.

In U.S. Pat. No. 5,487,616, the arrangement is designed by a greedy search procedure which permutes the character-to-key assignments and keeps the permutation when the permutation has a lower expected travel. By definition, greedy search procedure usually only find mediocre locally optimal solutions.

U.S. Pat. No. 5,625,354 describes a hexagonal "hunt and peck" keyboard which has keys arranged in a "honeycomb" type of pattern to minimize the distance between individual keys. More frequently occurring pairs of letters are clustered in close proximity to the center of the keyboard. The clustering is based on digraphs, specific frequencies of pairs of characters. A stylus is suggested to peck at the keys. However, there is no attempt to minimize the total distance that the stylus must move to enter text for a particular language.

U.S. Pat. No. 5,805,157 describes a "soft keyboard" with hexagonal keys. Hexagonal shape was chosen to facilitate discrimination of closed-spaced keys during pecking, and key spacing can be more dense. A mouse is suggested for the pointing, and a cursor "snaps" to the key. No attempt was made to optimize the keyboard for a particular language.

U.S. Pat. No. 6,011,554 describes a disambiguating keyboard with twelve keys. Multiple characters are assigned to each key, making keystrokes ambiguous. The ambiguous sequence is resolved by use of a library of prestored sequences.

SUMMARY OF THE INVENTION

Keys are arranged on a keyboard as follows. A training corpus of input symbol sequences is provided, for example, informal written English texts. Each unique symbol in the corpus has an associated key on the keyboard. A cost function that measures a cost C of inputting the symbols of the training corpus is globally minimized. Then, the keys are arranged on the keyboard according to the globally minimized cost function. To reduced the distance a pointer must move, the keys can also be arranged in a hexagonal pattern. Keystrokes on a keyboard are predicted by constructing a model from a training corpus. The training corpus includes symbol sequences. The model predicts a set of symbols, where each symbol of the set continues a particular symbol sequence using variable-length subsequences of the particular symbol sequence. A particular length is chosen to maximize a probability that the predicting is correct. Keys on the keyboard are highlighted. The highlighted keys correspond to selected symbols in the set of symbols.

DETAILED DESCRIPTION OF PREFERRED EMBODIMENTS

Figure 1:
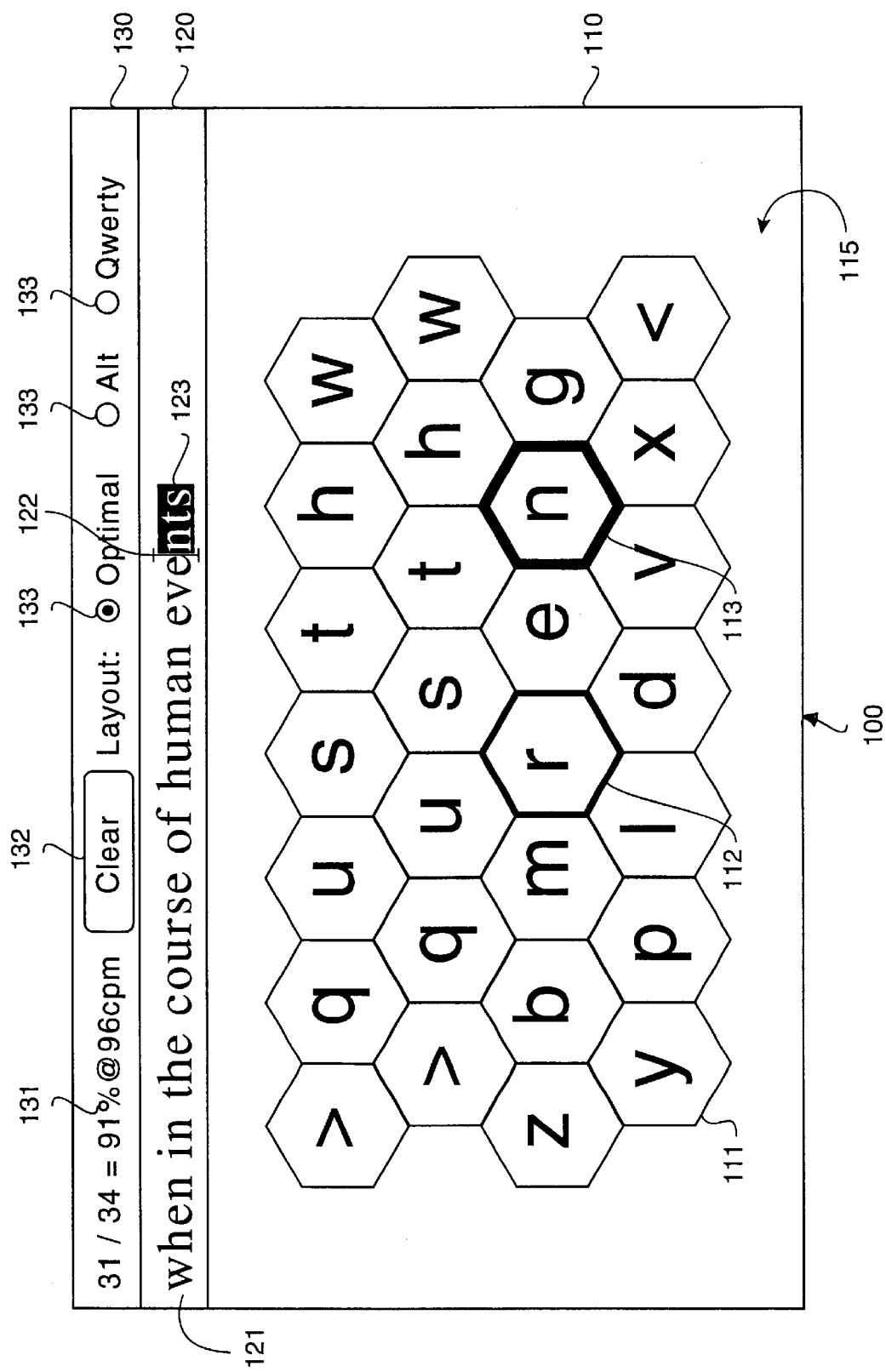
FIG. 1 is an arrangement of a keyboard according to the invention.

FIG. 1 shows a hunt-and peck keyboard 100 arranged according to my invention. My keyboard 100 minimizes the visual, cognitive, and motor load of a user, particularly a user with a single pointer, e.g., a finger, a stylus, eye gaze, or a mouse.

My arrangement is optimized to minimize all three loads, i.e., the cost of using the keyboard, mainly by minimizing the total distance a pointer needs to travel for a particular corpus of input, e.g., the English language. The keyboard can also be constructed with movable buttons. In the preferred embodiment, I arrange the keys 111 in a hexagonal pattern on a touch sensitive surface 115. A hexagonal pattern maximizes the size of each key for a particular number of keys arranged in a fixed area of the keyboard.

My keyboard 100 includes a portion 110 where the keys 111 are displayed. Some of the keys 112–113 are highlighted. The highlighted keys are "predicted" next keys, as described in greater detail below. A portion 120 displays entered characters 121. A cursor 122 indicates a current input position. A most likely completion 123 of a particular symbol sequence can also be displayed.

A portion 130 can display optional information, such as typing speed 131, clear entry 132, or buttons 133 that select other keyboard configurations.

In an alternative embodiment, my keyboard 100 can be constructed of physical keys and predicted keys 112–113 can be indicated by illuminated keys.

The keyboard is suitable for very small displays such as those used with cellular telephones, palmtop devices, wearable computers, as well as for handicapped-access devices.

The keyboard includes the following features. The keys are closely spaced. The arrangement of the keyboard is optimized to minimize the total work load which includes minimizing the distance traveled by a single pointer for a particular corpus of input, and saccade. For example, if the corpus is drawn from informal written English, then the pointer only travels an average of 1.6 key-widths for each character typed. For a traditional QWERTY keyboard, the average distance is over 4 key-widths. Thus, hunt time is reduced because eye saccades are minimized, and peck time is reduced because the pointer, (stylus, finger, or eye gaze) on the average, moves a smaller distance.

My keyboard predicts and suggests which key or keys are most likely to be typed next. Predicted keys 112–113 are highlighted to draw the user's attention. Thus, hunting and pecking is accelerated. The number of keys that are highlighted at a given instant in time is small, for example, three or less. Thus, the user has a small number of choices to make, and the cognitive load is reduced. For English writers, the predictions according to the invention are correct 76% of the time, on average.

For a particular corpus of input, the arrangement of the keys on the keyboard remains fixed so there is no overhead perceptual or cognitive load involved in tracking or interpreting changes in the arrangement. Although, the arrangement can be changed depending on the user and the kind of expected input. For example, if the corpus is Japanese (Katakana, Hiragana, Kanji, or Romaji), then the arrangement and character symbols can be changed accordingly.

Keyboard Arrangement

I determine an optimal arrangement of the keyboard 100 by globally minimizing a cost function C. The cost function C expresses a number of work load factors that determine visual, cognitive, and motor load. The primary factor is the total distance the pointer has to move for input in a particular training corpus, a secondary factor can be a weighted work load.

Advantages of Globally Minimizing a Load Cost Function

Globally minimizing this cost function has additional beneficial effects. The probability that subsequently typed characters are on adjacent keys is maximized. Global minimization also minimizes saccade. The most frequently typed characters are near the center of the keyboard, and mnemonic character sequences such as "ing" are on adjacent keys. In the prior art, as described above, the optimizations are generally local greedy searches. Local optimization only find local minimum, which are not always necessarily globally optimal.

Cost Function

A cost function for optimizing the arrangement of the keys can be expressed as:

$$C = \sum_{ij} d_{ij}^n f_{ij} + cD$$

where $d^n_{ij}$ is the physical distance between a subset of keys on the keyboard, e.g., a pair of keys, raised to the $n^{th}$ power, and $f_{ij}$ is a bigram or trigram probability of two or three characters, i.e., the relative frequency with which the characters assigned to the keys of the subset follow each other in the training corpus. In a practical application, the size G of the subset of keys is in the range of two to four.

For n=1, the first term of the cost function measures the expected total distance the pointer will travel while typing characters from that corpus with that keyboard. For n>1, the optimization is biased to reduce an expected length of long jumps between non-adjacent keys. For 0<n<1, the optimization is biased to increase a probability that frequently occurring character combinations lie on successively adjacent keys.

The second term, D, can factor in other considerations important to the user, with a weight c. In the preferred embodiment, $D=-d_{ik}f_{ijk}$, and $f_{ijk}$ is a trigram probability of successive characters in the training corpus are arranged on a cluster of adjacent keys.

If $D=d_{ik}f_{ijk}$, then the arrangement is maximized for typing characters in a straight line, or substantial linear manner. This term maximizes the distance between the first and last letter of a trigram. Of course this distance is maximized when the middle key lies between the outer keys in a linear manner, shortening the entire distance the pointer must travel.

It is also possible to add terms that bias the optimizations to find arrangements that partly resemble QWERTY or alphabetic-ordered keyboards.

Annealing

According to my invention, it is possible to find a keyboard arrangement that has a cost function that is very close to a global minimum without performing an exhaustive search on all of the approximately $10^{27}$ possible arrangements, an impossible task. I minimize the cost function C by an annealing process that guarantees a solution very close to the global optimum. The longer I run the annealing, the higher the probability that the solution is in fact the global optimum.

Example annealing processes include a simulated annealing and a deterministic annealing quadratic assignment.

Permutation Search

In a permutation search, the keyboard arrangement is changed slightly, for example, by "swapping" a subset of keys. The permuted arrangement is kept when it reduces the cost. The permutation can be random. In this case, wherein the cost increases, the permutation are be kept with a probability of $e^{-\Delta C/T}$, for an exponentially cooling positive temperature T. The slower the temperature cools, the higher the probability that the final solution is globally optimal. This process is called annealing.

Quadratic Assignment

In quadratic assignment process, I maintain a square assignment matrix of probabilities that each character is assigned to each key. The matrix is iteratively re-estimated to reduce the cost and is then re-projected onto a manifold of doubly stochastic matrices; those whose columns and rows each sum to 1. To make this a deterministic annealing algorithm, a term $-(T-k)H$ is added to the cost function, where T is again the temperature, k is a positive constant, and H is the entropy of the assignment matrix.

Initially, the temperature is kept high, forcing the annealing process to explore the large-scale structure of the space of possible solutions. The temperature is then allowed to cool, during which the process gradually commits to the most promising region of solution space. As the temperature nears 0, the assignment matrix is forced to zero entropy, at which point every character has been assigned to a unique key. This process is also globally quasi-optimal.

In the particular keyboard 100 shown, the space character is not included in the optimization, instead the user types a space by pointing anywhere in the portion 110 outside the hexagonal pattern 111. In other embodiments, the space character may be included in the optimization and assigned to one of the keys. Other embodiments of my invention may include additional keys near the edges of the portion 110. These optional keys can include mode keys that shift to numeric keyboards, keyboards of capital letters, punctuation keys, keys having common prefixes and suffices such as "re-" and "-ed," or keys that have special functions for the device operated by the keyboard. Any or all of these keys may be included in the optimization and assigned to the keys.

Key Prediction

Another key innovation of my keyboard is the use of variable amounts of context to predict what character the user will choose next, and the use of this prediction to reduce the cost of the user's input task. Alternatively stated, this is the problem of predicting which character is most likely to be the next character given a particular character sequence.

According to the invention, a prediction function looks as far back into the user's typing history as is informative for making a maximally specific and likely correct prediction.

Figure 2:
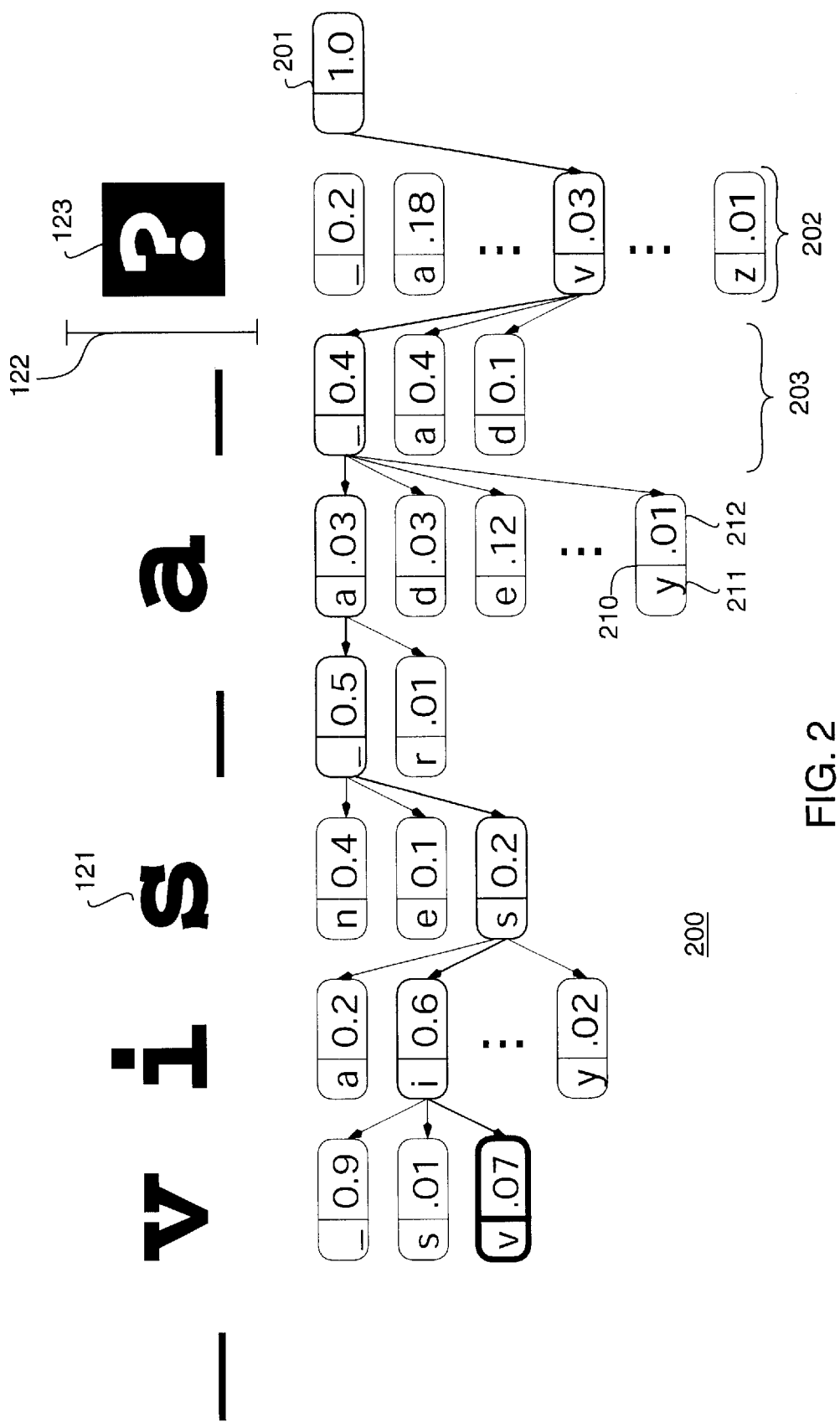
FIG. 2 is a graph of a variable memory length Markov model used by the invention.
Figure 3:
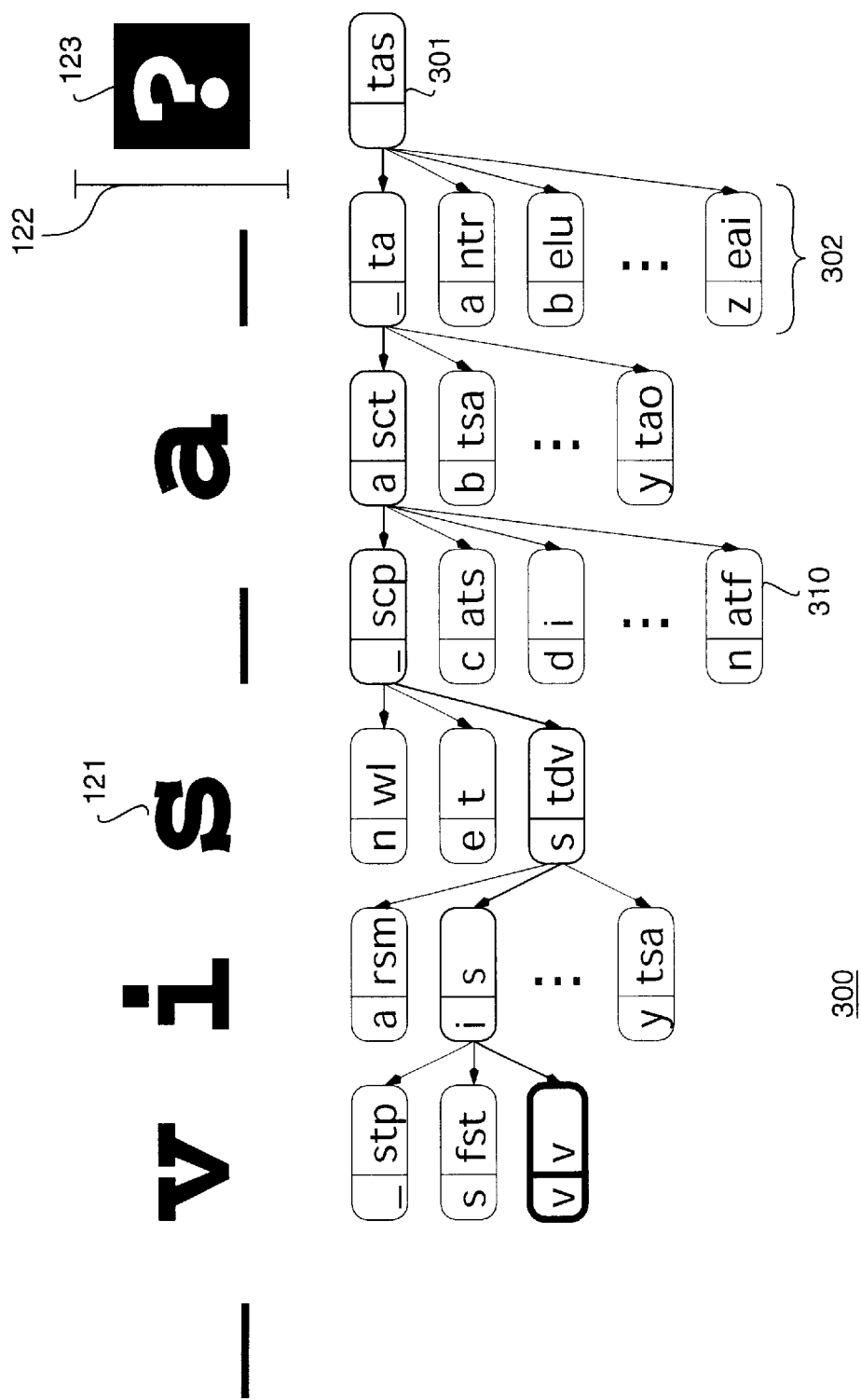
FIG. 3 is a graph of a decision tree used by the invention.

As shown in FIGS. 2 and 3, a variable memory length Markov model (VLMM) 200 or a decision tree 300 can be used to predict a next key depending on what the user has already typed. The model can be stored in a memory associated with the keyboard, for example, the memory of a hand-held computer. I estimate the models from a training corpus in a particular language, for example, English or Japanese. In the training corpus, the characters are arranged as sequences, e.g., sentences, and subsequences, phrases, words, etc.

The predicted keys are highlighted to help guide the user. Unlike prior art key prediction algorithms that use fixed size context windows, I use a context window that dynamically varies in size depending on the typing history. It should be noted, that the present invention can be used to input and predict any finite set of symbols that have an associated training corpus, for example, symbols of mathematical or chemical formulations, biological formulations, and the like.

Variable Memory Length Markov Model

In a VLMM 200, a next character to be typed is predicted from a dynamic length window of past characters, which we shall call the variable context window. However, unlike n-grams, which use a fixed length context window, the VLMM 200 dynamically optimizes the size of the context window.

For example, in English, the character 'q' is almost always followed by the character 'u.' Thus, in this case, just one letter of context is needed to make a prediction when that letter is 'q.' In other words, the size of the preceding context window is dynamically set to be one. The probability of the following character being something else than a 'u' is so low, that it is not worth the storage and processing cost to keep this information in the model. Therefore, such information is "pruned."

But, if the most recently typed character is a space, then the prediction process must look at the preceding word or words to make a useful prediction, and the size of the context window is dynamically set to, be much larger. A VLMM stores all useful contexts and associated probabilities in a tree. VLMMs are far more predictive and reliable than n-grams, and require less space to store.

In the VLMM 200, each node 210 of the tree stores a character 211 and an associated probability 212. To determine the probability of a prediction, a hypothesized character 123 is appended to the context string 121, and the probability of the resulting string is determined. The probabilities of all possible hypothesized characters are computed, and the three most highly ranked characters are suggested as predictions by highlighting the corresponding keys.

Constructing the VLMM

The VLMM 200 can be constructed as follows. A probability of 1.0 is assigned to a root node 201 having a default "null" character or symbol. A first next layer of the model 202 has one node for each character in the training corpus, e.g. the letters a to z, etc., and an associated probability that the character occurs. The nodes of the first layer are connected to the root node.

The training corpus is reexamined according to the estimated model, and another layer 203 of nodes is added, each node in the next layer recording the probability that the previous letter is one of the letters a-z, and so forth. The next layer is also connected to the preceding first layer, and so forth. Nodes are pruned when they represent rarely occurring substrings in the training corpus, e.g., the probability is less than a predetermined threshold. Nodes that convey redundant prediction information can also be pruned. Growth and pruning repeat until new nodes survive pruning. Other various refinements on this basic process are possible. For example, the depth of the tree can be limited.

To predict a next character, that is the probability of completing an input string, one finds a node in the first layer 202 of the tree 200 that matches the last typed character of the string, then, under that node, a sub-node that matches the next-to-last character of the string, and so on for the length of the sequence. One takes the probability P associated with the deepest node in the tree that matched a character. That will give the most likely correct prediction.

Depending on the implementation, the node may be marked with P, as shown, or P may be calculated by taking the product of all the probabilities on the path to the deepest node from the root node 201 of the tree.

If there are N remaining unmatched characters in the string and S possible characters, one can divide the probability P by $S^{(N-1)}$, and multiply that result by $(P-D)/(S-E)$, where D is the summed probabilities of the last matching node's sub-nodes and E is the number of such sub-nodes.

To compare the probability of two strings of different length, one must first apply the remaining-unmatched character procedure to the shorter string to recalculate its probability as if it were as long as the other string.

Decision Tree

A decision tree is a logic specification method that uses a branching representation for logic with decision points at each node of the tree 300, and the action to be taken at each node. The basic decision process can be stated as follows.

Each node 310 has an ordered list of predictions. One takes the context 123, i.e., the list of characters typed thus far, and traverses the tree 300 from its root, looking for a node that matches the most recently typed character, then a sub-node that matches the next more recently typed character, and so forth. In the decision tree 300, one simply takes the list of predictions at the last node that matches. As for the VLMM above, the length of the search is variable and depends entirely on the dynamics of typed context.

The VLMM 200 can be converted into the decision tree 300. The decision tree is less compact than the VLMM but requires less processing to make a prediction because computations on floating point probability number is not required. Instead, simple character comparison is done.

The decision tree 300 can be constructed from the training corpus as follows. Each node 310 of the tree 300 stores an ordered set of predictions. For example, a root node 301 stores the three most frequently occurring letters in the English language. Nodes in the next layer 302 store the ordered set of predictions that the character at the previous layer would be preceded by one of these characters. Nodes that do not make substantially different predictions than their immediate ancestors are pruned. That is, a node is pruned when adding a character to the context does not change one's expectation about the next character to be typed. For example, in English, the contexts "onk" and "monk" are essentially equivalent with respect to predictions, while the contexts "is_a_" and "vis_a_" are quite different, here underscores "_" represent spaces.

The models can be made precise by tabulating probabilities for each prediction and measuring differences between groups of predictions via cross-entropy, see Ron et al. "The Power of Amnesia: Learning Variable Memory Markov Models," Machine Learning, 1997. The model constructing can be made more powerful by delaying the pruning of nodes that have high probability but make little predictive difference. As with the Markov model, construction terminates when no new nodes survive pruning.

Selecting Predictions

The keyboard 100, "soft" or "hard," can be equipped with additional keys to aid in the selection of predictions. A first button selects a first prediction, a second button selects a second prediction, and so forth. Another button can be reserved for rejecting the predictions, in which case, a next most highly rated set of predictions can be presented. All such predictions can be determined from the variable memory length Markov model 200, or, if using the decision tree 300, by backing up along matching nodes' path, and taking the predictions of the nodes along the way.

Word Completion

In the case that the keyboard also suggests word completions, the models are equipped with a list of frequently occurring words, for example, words having five or more characters. These high frequency words are stored under the appropriate nodes of the model. If more than one word is stored at a particular node, then the words at that node are ordered according to how frequently the words appear in common usage, e.g., use unigram statistics as described by Woszczyna et al. in "Minimizing Search Errors Due to Delayed Bigrams in Real-Time Speech Recognition Systems," Proceedings of the Fourth International Conference on Spoken Language Processing, Vol.1, page 137, October, 1996.

When the user types a word, the word is similarly entered into the model. When the user types a known word or accepts a completion, that word is moved to the top of the ordered list of words at that node. Consequently, recently used words are offered first as completions. The completions can also be stored and searched separately as a semi-sorted list. Completions can also be timestamped and deleted if not used for some duration.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for arranging keys on a keyboard:
providing a training corpus of input symbols, each unique input symbol having an associated key on the keyboard;
globally minimizing a cost function that measures a cost of inputting the symbols of the training corpus; and
arranging the keys according to the globally minimized cost function.

2. The method of claim 1 further comprising the steps of:
constructing a model from a training corpus including symbol sequences, the model predicting a set of symbols, each symbol of the set continuing a particular symbol sequence using variable-length subsequences of the particular symbol sequence, a particular length chosen to maximize a probability that the predicting is correct;
highlighting keys on the keyboard, the highlighted keys corresponding to selected symbols of the set of symbols.

3. The method of claim 2 wherein the model is a decision tree.

4. A keyboard wherein keys are arranged according to the method of claim 1, and a predetermined number of predicted keys are highlighted.

5. The keyboard of claim 4 wherein a most likely completion of a particular input symbol sequence is displayed.

6. The method of claim 1 wherein the cost function is expressed as:

$$\sum_G d^n f + cD$$

where $d^n$ is a distance between a subset of G keys on the keyboard raised to an $n^{th}$ power, and f is a relative frequency with which a corresponding subset of symbols follow each other in the training corpus, and D is secondary work load term having a weight c.

7. The method of claim 6 wherein D is $-d_{ik}f_{ijk}$, where $f_{ijk}$ is a trigram probability of three successive symbols in the training corpus.

8. The method of claim 6 wherein D is $d_{ik}f_{ijk}$, where $f_{ijk}$ is a trigram probability of three symbols arranged substantially linearly in the keyboard.

9. The method of claim 1 wherein the cost function is expressed as:

$$\sum_G d^n f$$

where $d^n$ is a distance between a subset of G keys on the keyboard raised to an $n^{th}$ power, and f is a relative frequency with which a corresponding subset of symbols follow each other in the training corpus.

10. The method of claim 9 wherein for n=1, the cost function measures an expected total distance a pointer will travel while inputting the symbols of the training corpus.

11. The method of claim 9 wherein for n>1, the cost function is biased to reduce the total distance a pointer moves between non-adjacent keys.

12. The method of claim 9 wherein for 0<n<1, the cost function is biased to increase a probability that frequently occurring symbol combinations are arranged on adjacent keys.

13. The method of claim 1 further comprising the step of:
annealing while minimizing the cost function.

14. The method of claim 13 wherein the annealing is a deterministic annealing quadratic assignment.

15. The method of claim 13 wherein the annealing is simulated, and the minimizing includes a permutation search.

16. The method of claim 15 wherein a subset of keys are permuted, and wherein the permuted subset of keys is retained when the cost is reduced, and if the cost is increased, then the permuted subset of keys is retained with a probability of $e^{-\Delta C/T}$, for a cooling positive temperature T.

17. The method of claim 15 wherein the permuting is random.

18. A keyboard wherein keys are arranged according to the method of claim 1.

19. The keyboard of claim 18 wherein each key has a hexagonal shape.

20. The keyboard of claim 18 wherein the keys are movable buttons.

21. The keyboard of claim 18 wherein the size of each key is maximized for a particular number of keys occupying a fixed size area of the keyboard.

22. The keyboard of claim 18 wherein the keys are displayed on a touch sensitive surface.

23. The keyboard of claim 22 wherein the touch sensitive surface includes a first portion for displaying the keys, a second portion for displaying inputted symbols.

* * * * *